(12) United States Patent
Ishizaki et al.

(10) Patent No.: US 6,874,738 B2
(45) Date of Patent: Apr. 5, 2005

(54) ELEVATION REGULATOR OF DISPLAY

(75) Inventors: Takashi Ishizaki, Shizuoka (JP); Kenichi Hirasawa, Tokyo (JP)

(73) Assignees: Murakami Corporation, Shizuoka (JP); Nec-Mitsubishi Electric Visual Systems Corporation, Tokyo (JP)

( * ) Notice: Subject to any disclaimer, the term of this patent is extended or adjusted under 35 U.S.C. 154(b) by 0 days.

(21) Appl. No.: 10/467,053

(22) PCT Filed: Dec. 13, 2001

(86) PCT No.: PCT/JP01/10931

§ 371 (c)(1),
(2), (4) Date: Aug. 18, 2003

(87) PCT Pub. No.: WO03/050787

PCT Pub. Date: Jun. 19, 2003

(65) Prior Publication Data

US 2004/0056161 A1 Mar. 25, 2004

(51) Int. Cl.[7] .............................................. F16M 11/04
(52) U.S. Cl. ................................................... 248/176.3
(58) Field of Search ................................ 248/917, 920, 248/176.3, 921, 922, 923, 125.8, 404, 159, 123.11, 622, 919, 918, 125.2, 162.1, 132, 161, 157, 125.1

(56) References Cited

U.S. PATENT DOCUMENTS

| 3,890,907 A | * | 6/1975 | Peterson | 108/136 |
| 3,905,311 A | * | 9/1975 | Carpentier | 108/136 |
| 5,232,398 A | * | 8/1993 | Maki | 453/57 |

FOREIGN PATENT DOCUMENTS

JP            2000-105539         4/2000

* cited by examiner

Primary Examiner—Leslie A. Braun
Assistant Examiner—Kofi Schulterbrandt
(74) Attorney, Agent, or Firm—Oblon, Spivak, McClelland, Maier & Neustadt, P.C.

(57) ABSTRACT

An elevation regulator of display, comprising a base member 1, and an elevation member 3 moving up and down with respect to the base member 1. The elevation member 3 is provided with a part 6 for fixing a display D. The base member 1 is provided with spiral springs 2, 2 being uncoiled as the elevation member 3 lowers to urge the elevation member 3 upward.

5 Claims, 11 Drawing Sheets

FIG.11

ELEVATION REGULATOR OF DISPLAY

TECHNICAL FIELD

The present invention relates to a device for regulating elevation of a display, which supports a display such as CRT for personal computer or a television set, a liquid crystal display, a plasma display or a display utilizing LED.

BACKGROUND ARTS

In recent years, a display for displaying an image such as for a personal computer system or a television set has been intended to be light weight. Such a type of the display is mounted in front of a frame base possessed by a device for supporting a display in such a manner as to freely adjust the angle, whereby the direction of the display can be changed to meet the favorite of a user.

Figure 11:
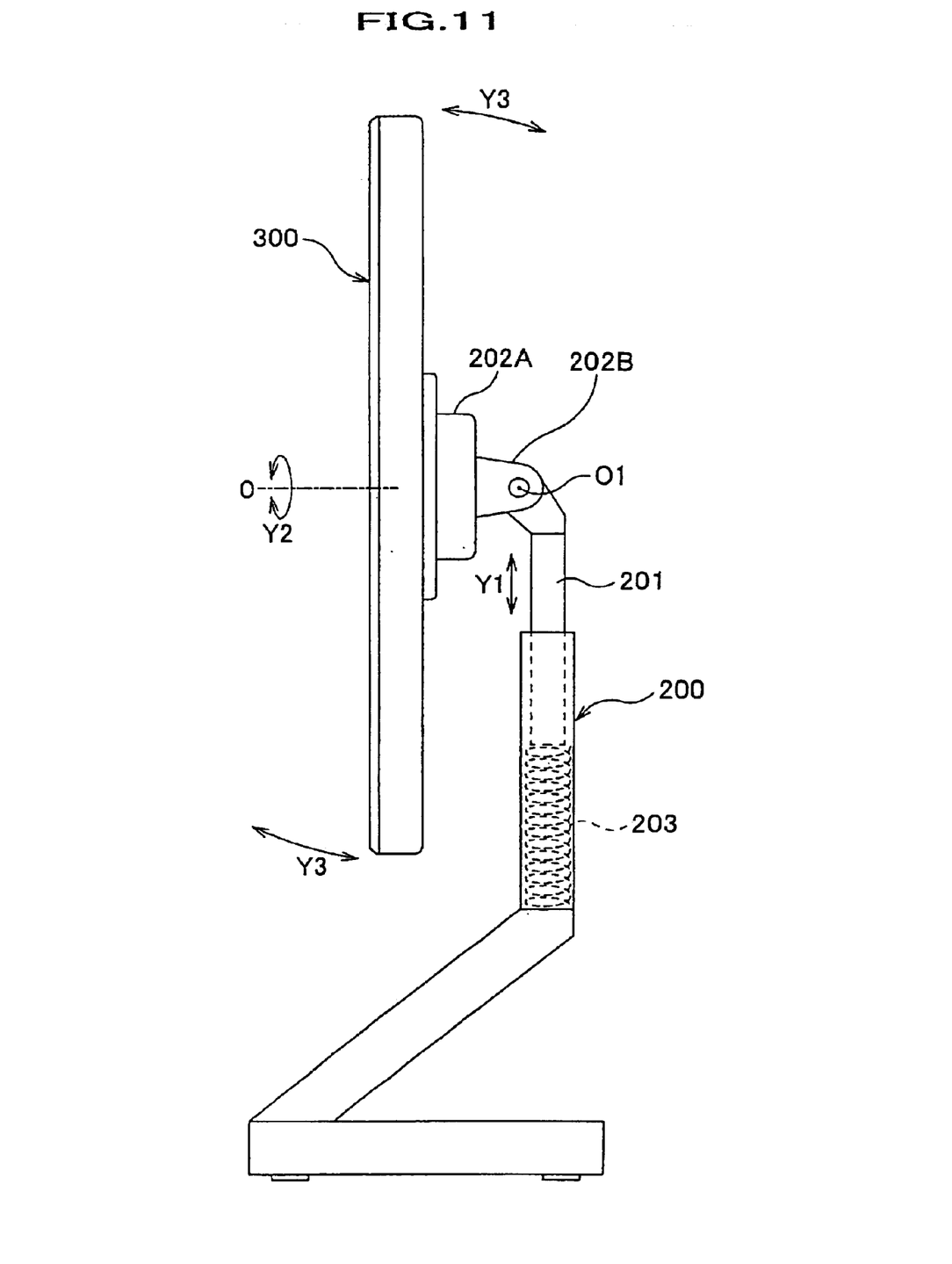
FIG. 11 is a side view of the conventional device for adjusting a direction of a display.

As an example of the device for supporting a display, an elevating device for ascending or descending a liquid crystal monitor as disclosed in Japanese Utility Model No. 3063920. As shown in FIG. 11, the elevating device for ascending or descending a liquid crystal monitor a cylindrical elevating member 201 provided on a frame base 299 in a manner that it can be elevated in the height direction Y1. A liquid crystal monitor 300 is fitted to an upper end portion of the elevating member 201 via a first supporting mechanism 202A and a second supporting mechanism 201B. The liquid crystal monitor 300 is supported by the first supporting mechanism 202A so as to be adjustable to the rotation around the center axis O in the rotating direction of Y2 and by the second supporting mechanism 202B so as to be adjustable to the rotation around the traverse axis O1 in a vertically tilting direction Y3.

However, in the elevating device for ascending or descending a liquid crystal monitor disclosed in Japanese Model disclosed above, a contracting coil spring applies a resilient force in the vertical direction to the elevating member 300, which supports the liquid crystal monitor 300 via the first supporting mechanism 202A and the second supporting mechanism 202B. For this reason, in the case where the height of the elevating member 201 is different, the length of the contraction of the contracting coil spring is different. For this reason, the elastic force of the contracting coil spring 203 which elastically supports the liquid crystal monitor 300 is differed. Specifically, for example, when the elevating member 201 is positioned at a high position and when the coil spring 203 is expanding, in which case the resilient force is small, a large force is required for picking up the elevating member 201. Conversely, when the elevating member 201 is positioned at a low position and when the contracting coil spring 203 is contracted, in which case the resilient force becomes large, a large force is required for pushing in the elevating member 201. As described above, since the elastic force for supporting the elevating member 201 is differed depending on the vertical position, there is a problem that the use cannot change the vertical position by a stable operation force.

An object of the present invention is, therefore, to provide a device for regulating elevation of a display in which the user can vertically move the elevating member by a stable operation force even if the vertical position of the elevating member is different.

SUMMARY OF THE INVENTION

The invention according to Claim 1 in order to solve the problems described above is a device for regulating elevation of a display having a base member; an elevating member which can vertically move relative to said base member; and a display mounter for mounting a display provided on said elevating member;
wherein a spiral spring which is wound out according to the descending of said elevating member and which applies a resilient force to said elevating member from a lower to an upper direction.

The invention according to Claim 2 is the device for regulating elevation of a display according to Claim 1, wherein a guide portion for guiding vertical movement of said elevating member and a center guide member for fixing said elevating member are provided on said base member.

The invention according to Claim 3 is the device for regulating elevation of a display according to Claim 1, wherein a spacer, which guides the vertical movement of the elevating member relative to said base member is provided.

The invention according to Claim 4 is the device for regulating elevation of a display according to Claim 2, wherein a spacer, which guides the vertical movement of the elevating member relative to said base member is provided.

The invention according to Claim 5 is the device for regulating elevation of a display according to Claim 3, wherein said spacer is made of a resin.

The invention according to Claim 6 is the device for regulating elevation of a display according to Claim 4, wherein said spacer is made of a resin.

BEST MODES FOR CARRYING OUT THE INVENTION

Figure 1:
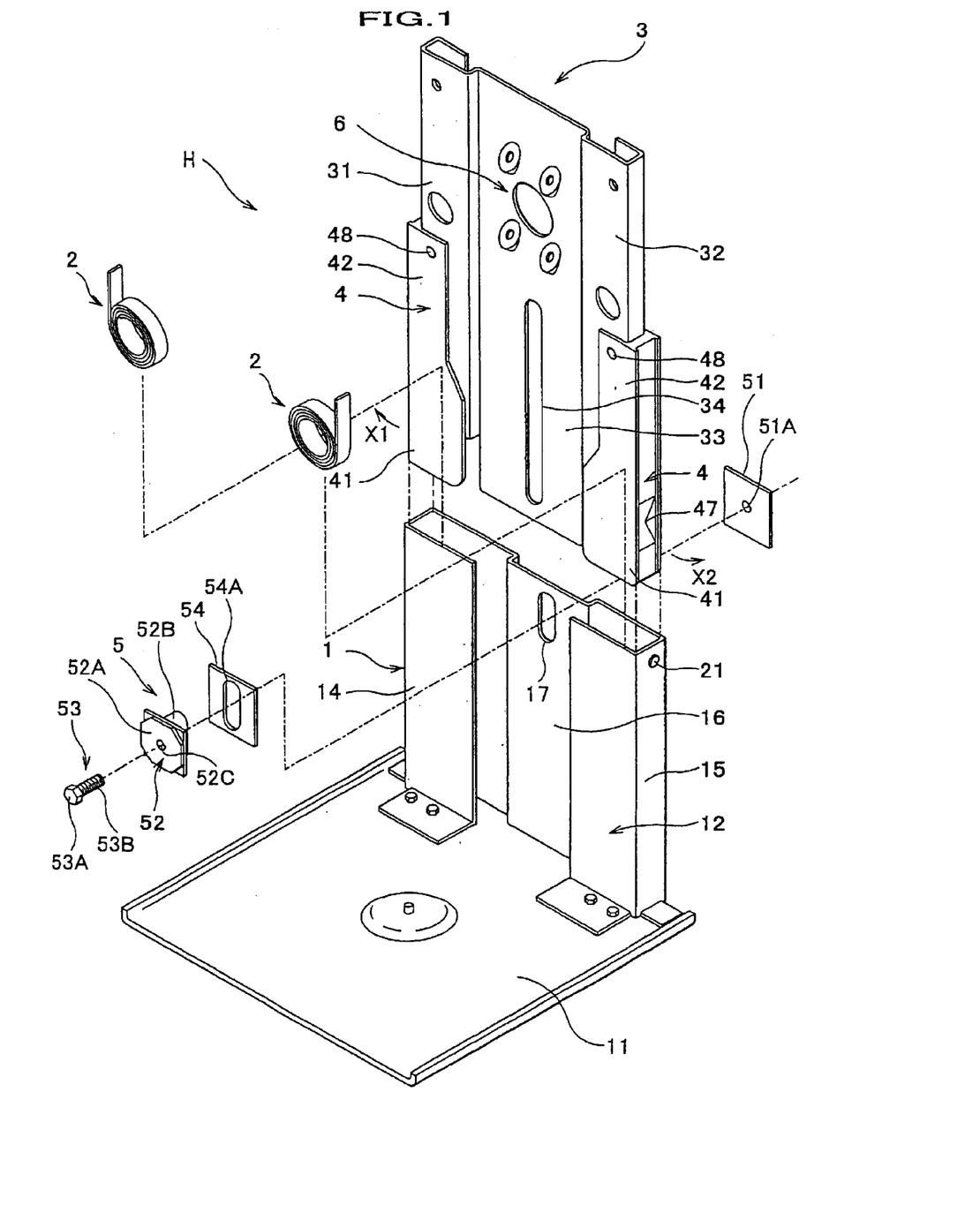
FIG. 1 is an exploded perspective view showing the device for regulating elevation of a display according to the first embodiment.
Figure 2:
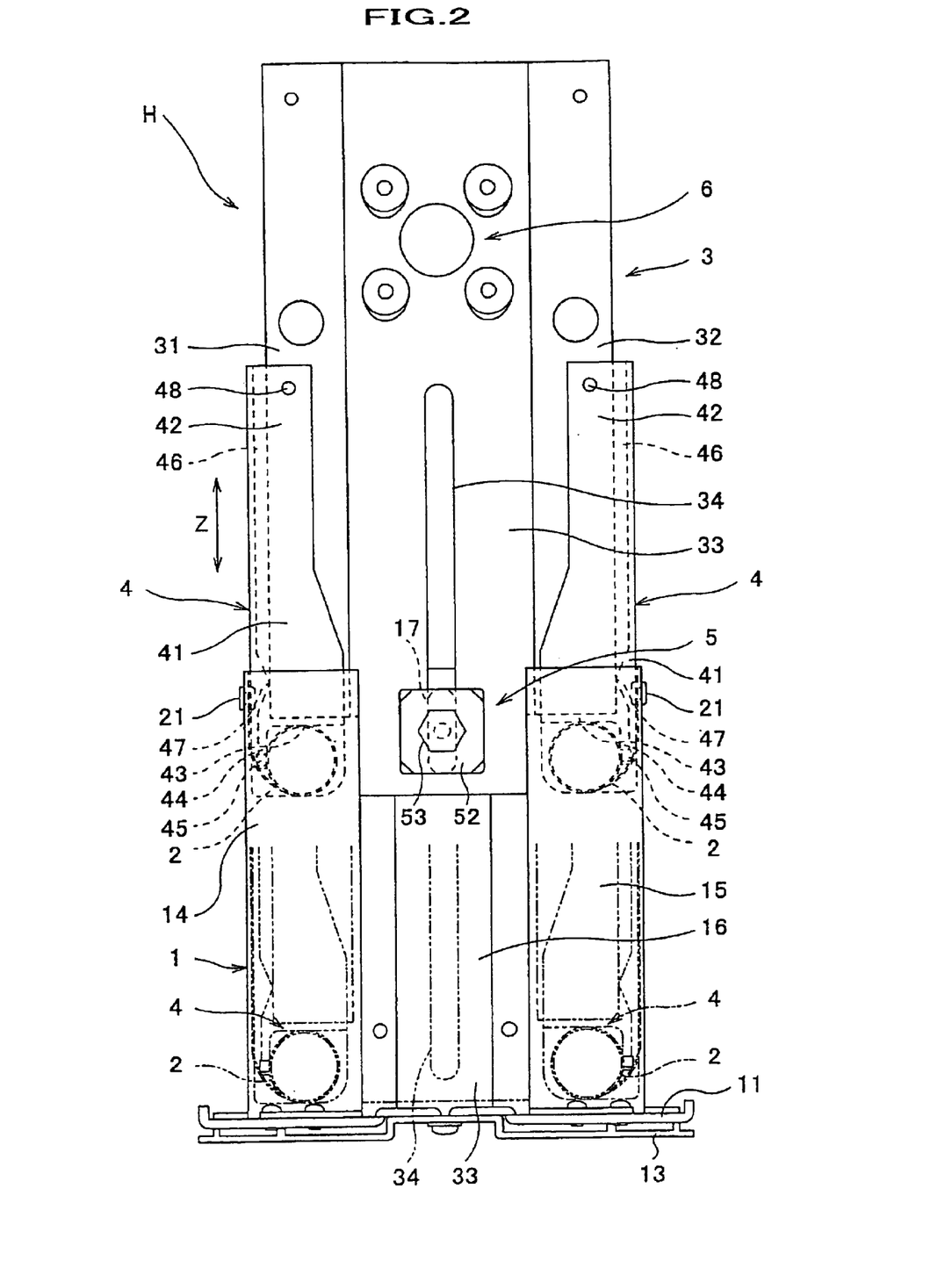
FIG. 2 is a front view of device for regulating elevation of a display according to the first embodiment.
Figure 3:
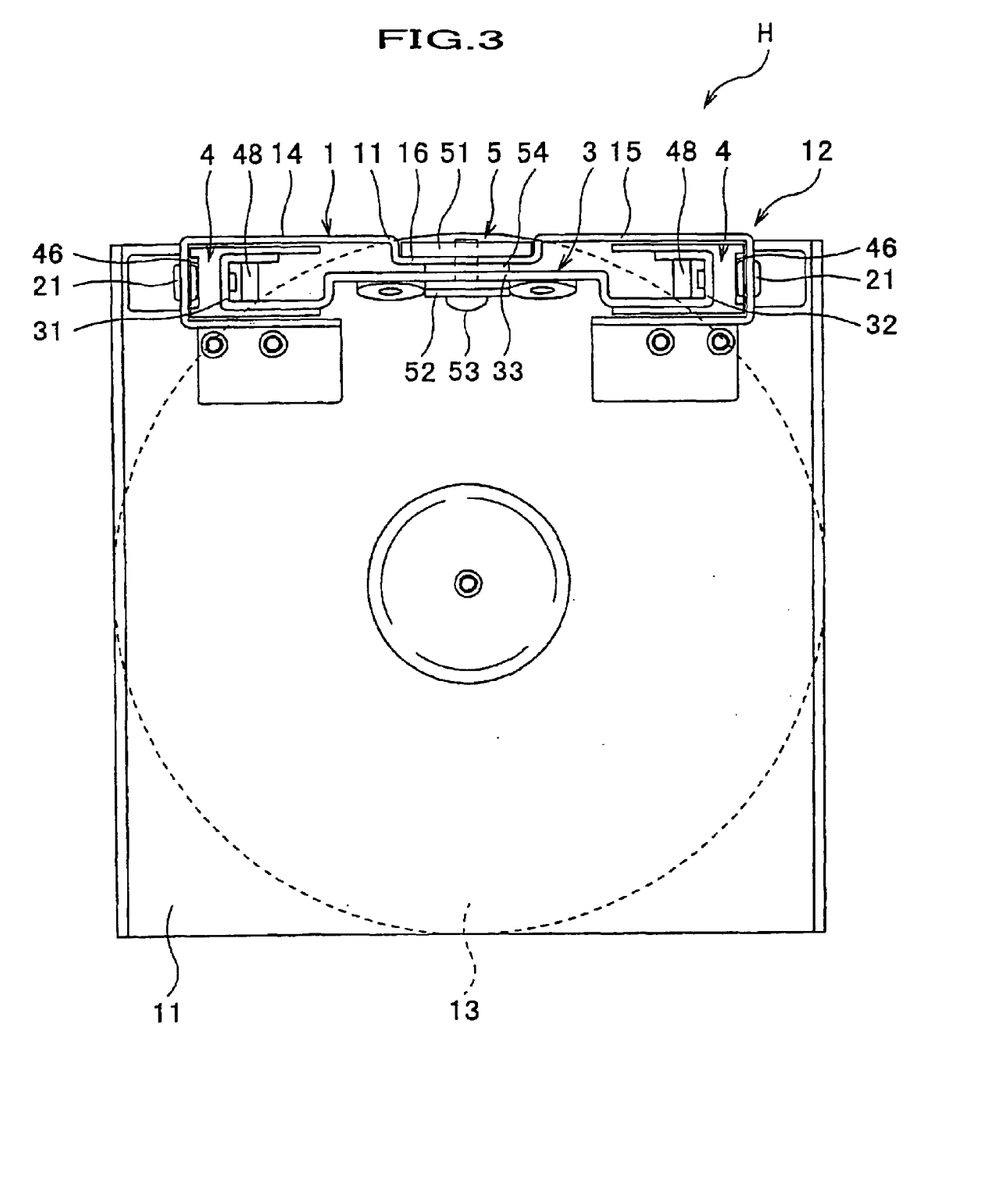
FIG. 3 is a plane view of device for regulating elevation of a display according to the first embodiment.
Figure 4:
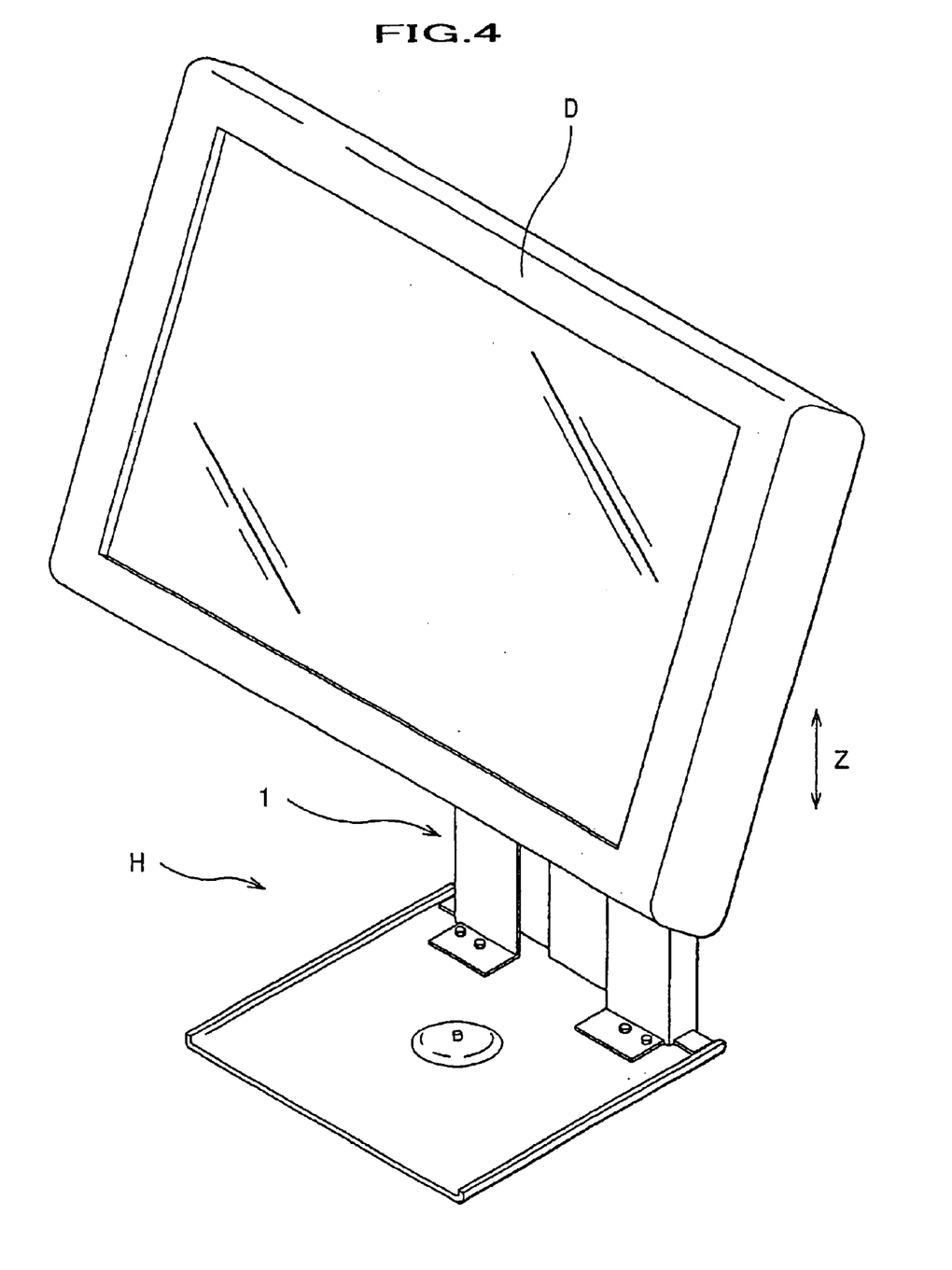
FIG. 4 is a perspective view of device for regulating elevation of a display according to the first embodiment.

A first embodiment of the present invention will now be specifically described by referring to the drawings. FIG. 1 is an exploded perspective view showing the device for regulating elevation of a display according to the first embodiment, FIG. 2 is a front view thereof, FIG. 3 is a plane view thereof, and FIG. 4 is a perspective view thereof.

As shown in FIG. 1, a device H for regulating elevation of a display according to the present invention has a base member 1, spiral springs 2 and 2 and an elevating member 3. Spacers 4 and 4 are fitted to both ends of the elevating member 3, a center guide member 5, which fixes the height position of the elevating member 3 relative to the base member 1 is provided at the central position of elevating member 3 in the height direction. Furthermore, a display mounter 6 is provided on a front side of the elevating member 3 at an upper portion.

The base member 1 has a pedestal 11 and a holder 12. A circular rotation table 13 shown in FIG. 3 as a broken line is provided within the pedestal 11 so as to be able to rotate in the vertical direction.

The holder 12 is made of a metal, stands along one end of the pedestal 11, and guide portions 14 and 15, which form slide groove extending towards a vertical direction, are provided on both ends of the holder 12 viewing from the front side. The space between the guide portions 14 and 15 is opened at the front side, and has a center guide portion 16 for connecting the guide portions 114 and 115 provided at a rear side. The center guide portion 16 of the holder 12 is formed so that it is bent to slightly project toward a front side, and has a through hole 17 formed on an upper side thereof. As described above, since the center guide portion 16 of the holder 12 is formed into a shape so as to project towards a front side, and since it is guided and supported by the center guide member 5, it prevents the device H for regulating elevation of display from being felt down towards the front side due to the weight of the display D and from being unduly moved towards a horizontal direction.

Spiral springs 2 and 2 are provided within the guide portions 14 and 15, respectively, and one ends of the spiral springs 2 and 2 are fixed onto inner sides of the guide portions 14 and 15 by means of fixing members 21 and 21. The spiral springs 2 and 2 are fitted so that the winding portions thereof are wounded following the descending of the elevating member 3. Also, when the winding portions of the spiral springs 2 and 2 are wounded as described above, the resilient forces thereof are directed towards a direction that the elevating member 3 is pushed up. In this case, the resilient forces of the spiral springs 2 and 2 are always at substantial constant regardless of an amount of winding.

The elevating member 3 is made of a metal, and has inserting portions 31 and 32 which are inserted into the guide portions 14 and 15 of the base member 1, respectively provided thereon. These inserting portions 31 and 32 of the elevating member 3 are inserted into the guide portions 14 and 15 of the base member 1 so that the elevating member 3 may be relatively moved toward the vertical direction (Z direction in FIG. 2) relative to the base member 1. The space between the inserting portions 31 and 32 of the elevating member 3 is opened at the rear side, and is connected at a front side to a central portion 33 formed so that it is bent to slightly project toward a rear side. The central portion 33 has the display mounter 6 provided at an upper portion, and the display mounter 6 is fitted so that the display D can be mounted as shown in FIG. 4. Furthermore, the display mounter 6 provided on the central portion 33 of the elevating member 3 has a slider-inserting pore having an oval shape which possesses a linear portion extending towards a height direction formed on a lower portion.

Spacer 4 and 4 are provided on the outer sides of the inserting portions 31 and 32 of the elevating member 3, respectively. The spacers 4 and 4 are made of a resin, they have a size one size smaller than that of the inserting portions 31 and 31 of the elevating member 3, and lower portions 41 and 41 are wider than upper portions 42 and 42 thereof viewing from the front side. As shown in FIG. 2 as a broken line, within the interiors of the lower portions 41 and 41 of the spacers 4 and 4, bottom portions 43 and 43 are provided respectively. Flanges 44 and 44 are provided on the outsides of the bottom portions 43 and 43 of the spacers 4 and 4, respectively, and winding guides 45 and 45 are provided on lower ends of the flanges 44 and 44, respectively. Specifically, when the spacers 4 and 4 are inserted into the inserting portions 31 and 31 of the elevating member 3, the winding portions of the spiral springs 2 and 2 are come into contact with the bottom portions 43 and 43 of the spacers 4 and 4 to support the elevating member 3.

Furthermore, groove portions and 46 are provided on outsides of the spacers 4 and 4, and deforming portions 47 and 47 projecting inwardly are unified at lower portions of the groove portions 46 and 46. The groove portions 46 and 46 of the spacers 4 and 4 are configured so that expanding portion of the spiral springs 2 and 2 expanded when the elevating member 3 descends are inserted. At the time when the elevating member 3 is inserted into the guide portions 14 and 15 of the base member 1, the spacers 4 and 4 are come into contact with the guide portions 14 and 15, and they are guided by the guide portions 14 and 15 to vertically move together with the elevating member 3.

Upper portions potions 42 and 42 of the spacers 4 and 4 are rotatably fitted to the elevating member 3 by means of shafts 48 and 48 so that they can be waved in the X1 direction and X2 direction shown in FIG. 1. The deforming portions 47 and 47 of the spacers 4 and 4 are come into contact with the side surfaces of the inserting portions of the elevating member 3 and apply resilient forces so that the spacers 4 and 4 are slightly pushed up to the outer side. In this case, since the spacers 4 and 4 are made up of a resin, for example, even if the guide portions 14 and 15 are made of a metal, generation of uncomfortable sound at the time of rubbing metals and galvanic corrosion due to the contact with metals can be prevented.

Furthermore, the center guide member 5 possesses a square nut 51, a slide stopper 52, a bolt 53, and a packing spacer 54. The square nut 51 is fixed on the rear surface of the center guide portion 16 of the holder 12, and a bolt pore 51A is formed on the central portion thereof. The slide stopper 52 is made of a resin and is provided on a front side of the elevating member 3, and has a body 52A and an inserting portion 52B. A through hole 52C for a bolt which is pierced between the body 52A and the inserting portion 52 is formed on the slide stopper 52B. The inserting portion 52A of the slide stopper 52 has a cross-sectional shape substantially similar to that of the shape of the opening of a pore 34 for inserting a slider formed in the elevating member 3. An inserting portion 52B of the slide stopper 52 is inserted into the pore 34 for inserting a slider.

The bolt 53 of the center guide member 5 has a head portion 53A and a screw portion 53B. The screw portion 53B of the bolt 54 is inserted into the through hole 52C for a bolt form on the slide stopper 52 from a front side, and passed through the pore 34 for inserting a slider of the elevating member 3, and is screwed into the bolt pore 51A formed on the square nut 51. By the clamping force of the bolt 53, the elevating member 3 and the base member 1 are sandwiched by the square nut 51 and the slide stopper 52 so as to prevent the elevating member 3 from being felt down toward the base member 1 and to regulate the horizontal movement of the elevating member 3.

The packing spacer 54 is made of a resin and as shown in FIG. 3, it is provided between the elevating member 3 and the base member 1. On the packing spacer 54, a through hole 54A for a bolt having an opening with the shape substantially the same as the opening of the through hole 17 formed on base member 1 is formed. The packing spacer 54 is positioned so that the through hole 54A for a bolt is overlapped with the through hole 17 of the base member 1. By placing the packing spacer 54 between the base member 1 and the elevating member 3 as described above, generation of uncomfortable sound at the time of rubbing metals and galvanic corrosion due to the contact with metals can be prevented.

To the device H for regulating elevation of a display having such a construction is fitted, for example, a display D as shown in FIG. 4. The device H' for regulating elevation of a display is used by the user in the state where the height is adjusted to the position desired for the user depending on the condition. In the device H' for regulating elevation of a display, the elevating member 3 is inserted into the guide portions 14 and 15 of the base member 1. At this time, the inserting portions 31 and 32 of the elevating member 3 slightly push up the deforming portions 47 and 47, to apply the reproducing resilient force to the deforming portions 47 and 47. For this reason, the spacers 4 and 4 are pushed up in an elastic manner to the side portions of the guide portions 14 and 14 (X1 direction and X2 direction in FIG. 1). By such a construction, at the time of ascending or descending the elevating member 3, the elevating member 3 slides to the guide portions 14 and 15 by the friction depending upon the reproducing resilient force of the deforming portions 47 and 47. Also, as described above, the clearance between the base member 1 and the elevating member 3, i.e., between the guide portions 14 and 15 of the base member land the inserting portions 31 and 31 of the elevating member 3, is removed to support smooth vertical movement of the elevating member 3 relative to the base member 1.

It is noted that the elevating member 3 as described above is freely operated as a rule, but by adjusting the bolt 53 of the center guide member 5 the operation force of the elevating member 3 may be lightened or by tightly clamping the bolt 53, the elevation of the elevating member 3 may be regulated.

Also, the parts described above may be produced in a unified state to further decrease the number of parts. It is noted that materials for each parts may be freely selected, for example, part of or all of the parts may be made of, e.g., a metal, a resin, a reinforcing plastic, or such.

Subsequently, a second embodiment of the present invention will now be described by referring to the drawings.

Figure 5:
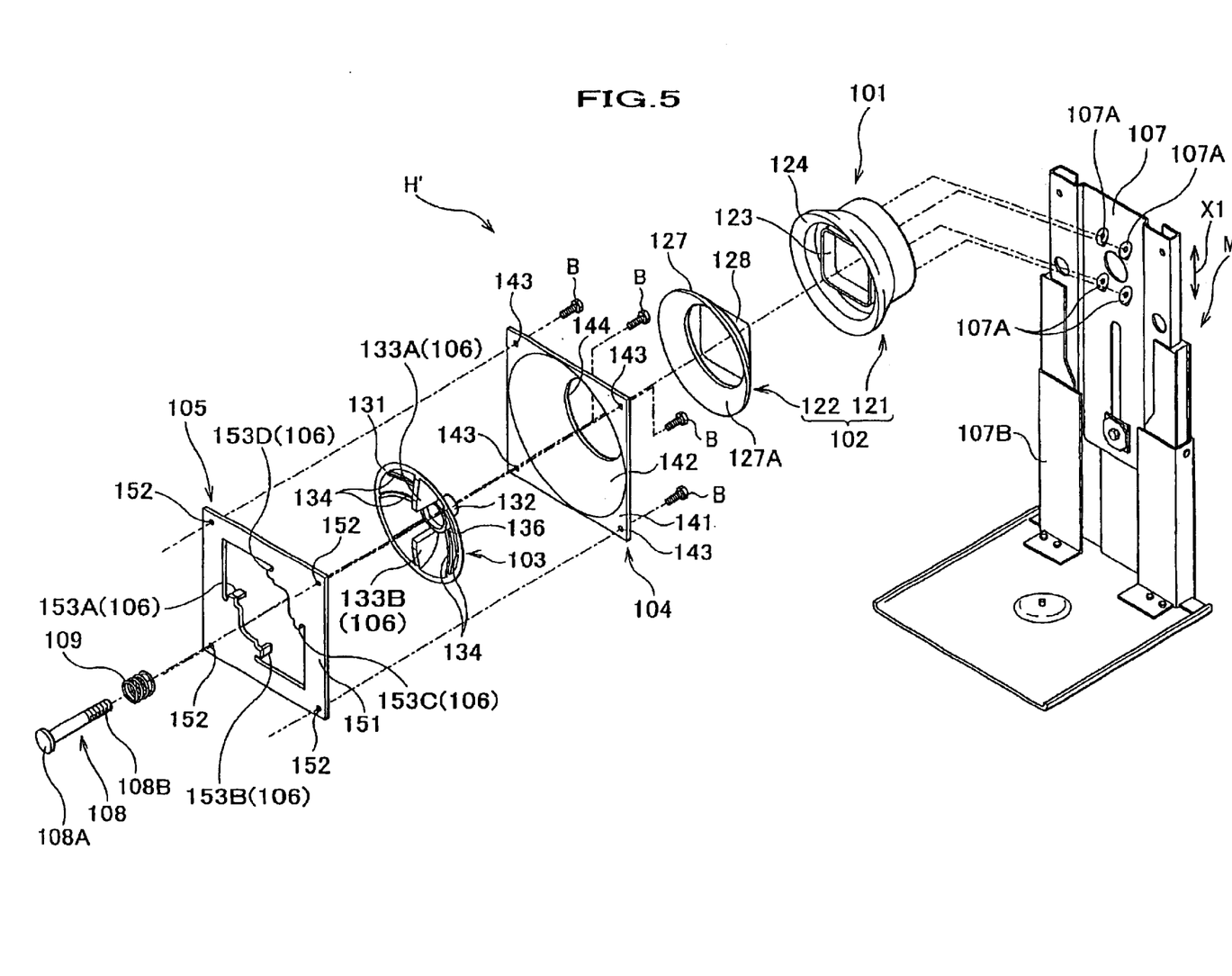
FIG. 5 is an exploded perspective view showing the device for regulating elevation of a display according to the second embodiment partially showing the main portions.

FIG. 5 is an exploded perspective view showing the device for regulating elevation of a display according to the second embodiment partially showing the main portions.

As shown in FIG. 5, a device H' for regulating elevation of a display according to the present invention has a frame M, and a display mounter 101 is provided on an upper portion of the frame M. In this embodiment, parts except for the display mounter 101 are the same as those in the first embodiment.

The display mounter 101 has a base member 102, a cap supporting member 103, a flange 104, and a member 105 for regulating an angle. Also, the cap supporting member 103 is provided in front of the base member 102, and the flange 104 is provided between the cap supporting member 103 and the base member 102. Furthermore, the member 105 for regulating an angle, by which the display is supported is provided in front of the cap supporting member 103. Stoppers 106 are provided on the cap supporting member 103 and the member 105 for regulating an angle in order to regulate the sliding of the flange 104.

On the other hand, the device H' for regulating elevation of a display possesses an elevating member 107 in the height direction X1. On an upper portion of the elevating member 107 are provided four mounting stands 107A, 107A, ..., to which the display mounter 101 is fit. The elevating member 107 is also provided on a frame base 107B in a manner of freely ascending and descending, and a spiral spring (not shown) is provided within the frame base 107B. The spiral spring is provided at a position where it is wound according to the descending the elevating member 107, and is applied to a resilient force to the elevating member 107 from a lower direction so that the resilient force becomes substantial constant regardless of an amount of winding. Moreover, the floor panel of the frame M can be rotated in the horizontal direction, and the horizontal rotation of the floor panel makes it possible to circulate the frame M in the vertical direction.

Subsequently, the base member 102 has a base body 121 and a spacer 122, both made of a resin. At the center of the front side of the base body 121, an inserting projection 123 having a substantial rectangular shape viewing from the front side is formed, and a base stand 124 having a circular shape viewing from the front side is provide around the inserting projection 123. The inserting projection 123 of the base body 121 and the front face of the base stand 124 have the same spherical curve, so that the rear face of the spacer 122 is supported by these inserting projection 123 and the front face of the base stand 124.

Figure 7:
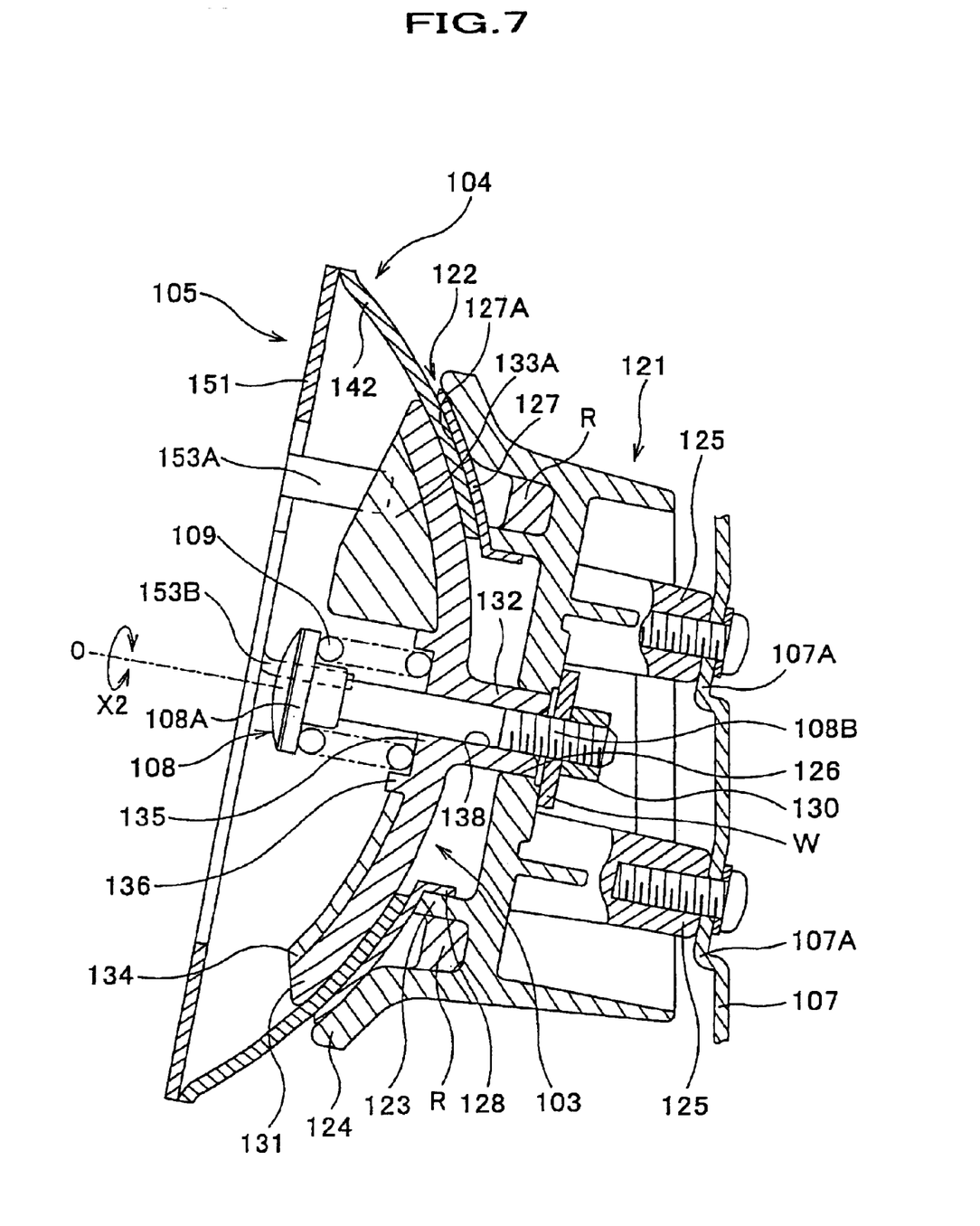
FIG. 7 is a cross-sectional view of FIG. 6 taken along the line III—III.

Furthermore, between the inserting projection 123 and the base stand 124, ribs R and R for imparting strength are provided as shown in FIG. 7. On a rear portion of the base body 121, four bolt mounters 125, 125 ... having bolt pores formed thereon are provided. The bolt mounters 125, 125 ... are provided on corresponding portions of mounting stands 107A, 107A, ... provided on an upper portion of the elevating member 107, respectively.

An inserting hole 126 as shown in FIG. 7 is formed at a center of the base body 121. The inserting hole 126 has a circular shape viewing from the front side, and a nut 130 is provided on a rear portion thereof via a washer W.

The spacer 122 described above has a pedestal 127 and a rear side inserting portion 128. The front face of the pedestal 127 of the spacer 122 has a spherical shape and the center thereof is formed so that the receiving surface 127 can be largely opened. On the other hand, the rear side inserting portion 128 of the spacer 122 has a substantial rectangular shape viewing from the front side and has a figure similar to the inserting projection 123 of the base body 121 smaller than the later as the thickness of the inserting projection 123. The rear side inserting portion 128 of the spacer 122 is inserted into the inserting projection 123 of the base body 121 to fit the spacer 122 to the base body 121.

The cap supporting member 103 has a cap body 131 and a rear side inserting portion 132. The cap body 131 makes up a part of a spherical shape having the substantially same curvature as that of the receiving face 127A of the pedestal 127 of the spacer 122, and has vertically arranged two wall portions 133A and 133B for a stopper making up a part of the stopper 106 and six reinforcing ribs 134, 134, ... provided in front thereof. Each of these wall portions 133A and 133B for a stopper is arranged so as to extend in the vertical direction and is provided so as to project towards the front of the member 105 for regulating an angle. On the other hand, the reinforcing ribs 134, 134, ... are provided so as to slightly project from the front surface of the cap body 131. Furthermore, at a substantially center of the cap body 131, a spring receiver 135 is formed. The spring receiver 135 is formed in the state that it is surrounded by projections 136 each having a circular shape viewing from the front side, and the projection 136 is provided so as to slightly project from the reinforcing rib 134 respect to the front surface of the cap body 131.

The rear side projecting portion 132 provided on a rear surface of the cap body 131 has a cylindrical shape having an external diameter substantially the same as an inner surface of the inserting hole 126 formed at the center of the base body 121, and has a through hole 138 for bolt through which a bolt 108 is bored formed at a central portion thereof. The rear side projecting portion 132 is inserted into an opening formed on the center of the pedestal 127 of the spacer 122, and is inserted into the inserting hole 26 formed at the center of the base body 121.

The flange 104 has a panel portion 141 and a spherical portion 142 at the center of the panel portion 141 having a concave formed on a rear side. The panel portion 141 of the flange 104 has a rectangular shape viewing from the front side, and through holes 143, 143, . . . are formed of the four corners thereof. The spherical portion 142 of the flange 104 makes up a part of the spherical surface having the substantially same curvature as that of the receiving face 127A and the cap body 131 of the cap supporting member 103. At a central portion of the spherical portion 142, an opening 144 is largely formed into which the rear side projecting portion 132 of the cap supporting member 103 is inserted. Furthermore, the spherical portion 142 of the flange 104 is sandwiched between the receiving face 127A of the pedestal 127 of the spacer 122 and the cap body 131 of the cap supporting member 103 in a slidable manner. By such a construction, the flange 104 is held and fitted in the state that it can be rotated around a center axis O at the angel of 90° in the rotating direction X2, around a traverse axis O1 in vertically tilting direction X3, and around a vertical axis O2 in horizontal tilting direction X4 (see FIG. 8).

Figure 10:
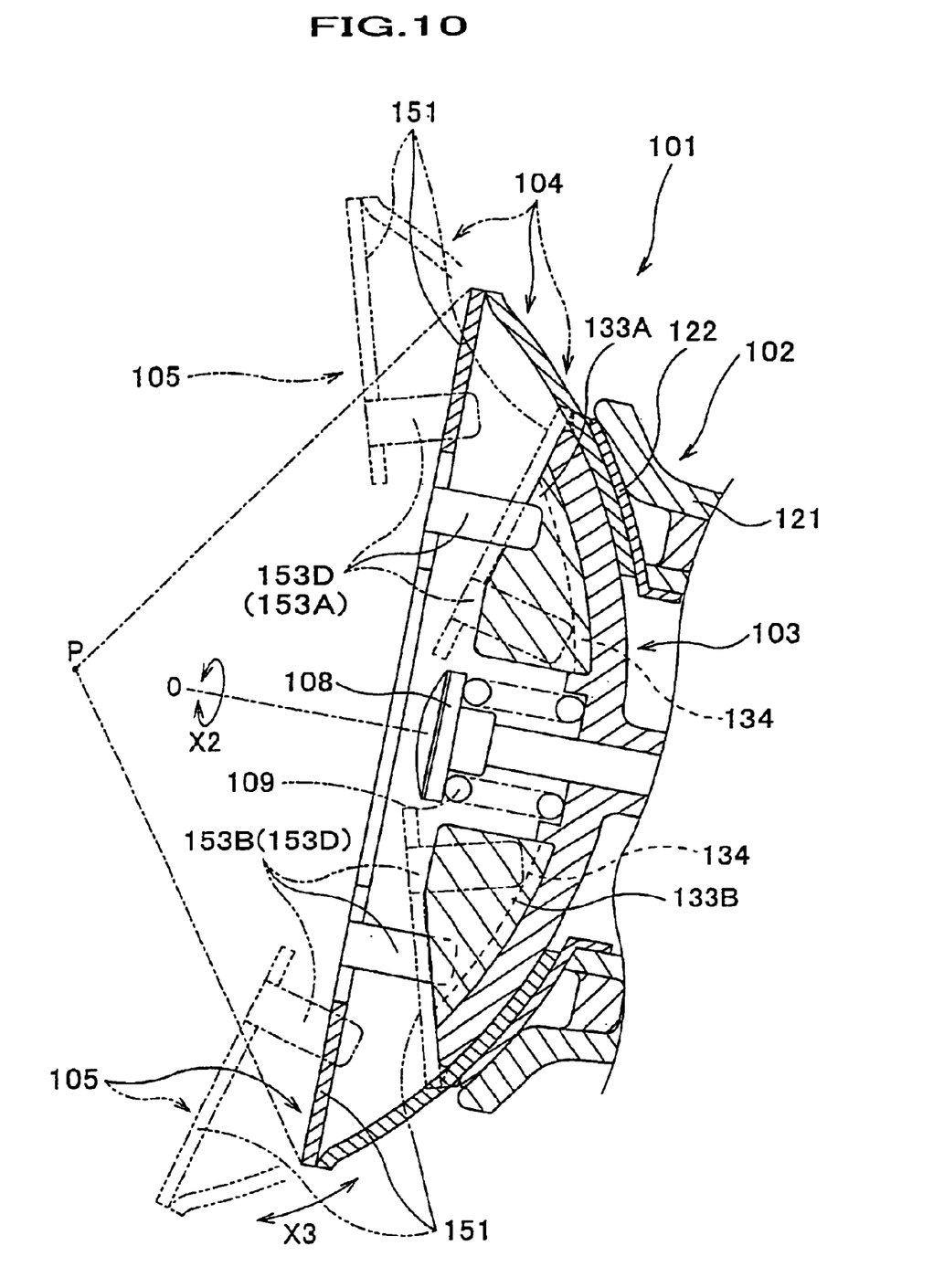
FIG. 10 is an explanatory view showing the rotation of the display mounter.

In this case, as shown in FIG. 10, the center axis 0, the traverse axis O1 and the vertical axis O2 are defined as ideal axes passing through an origin, assuming the center P of the rotation of the flange 104 as the origin, which will be utilized in the following description.

In front of the flange 104, the member 105 for regulating an angle is provided. The member 105 for regulating an angle has a plate-from main body 151 having substantially the same sides as those of the panel 141 of the flange 104. Through holes 152, 152, . . . are formed on the positions corresponding to the through holes 143, 143, . . . formed on the four corners of the panel portion 141 of flange 104. Furthermore, Bolts B, B, . . . are inserted into the through holes 143, 143, . . . formed on the flange 4 and the through holes 152, 152, . . . formed on the member 105 for regulating an angle, and these bolts B, B, . . . are screwed into bolt pores (not shown) formed on rear surfaces of the display D shown in FIG. 8. By such a construction, flange 104 and the member 105 for regulating an angle are fixed onto the display D in a co-screwing state.

Figure 8:
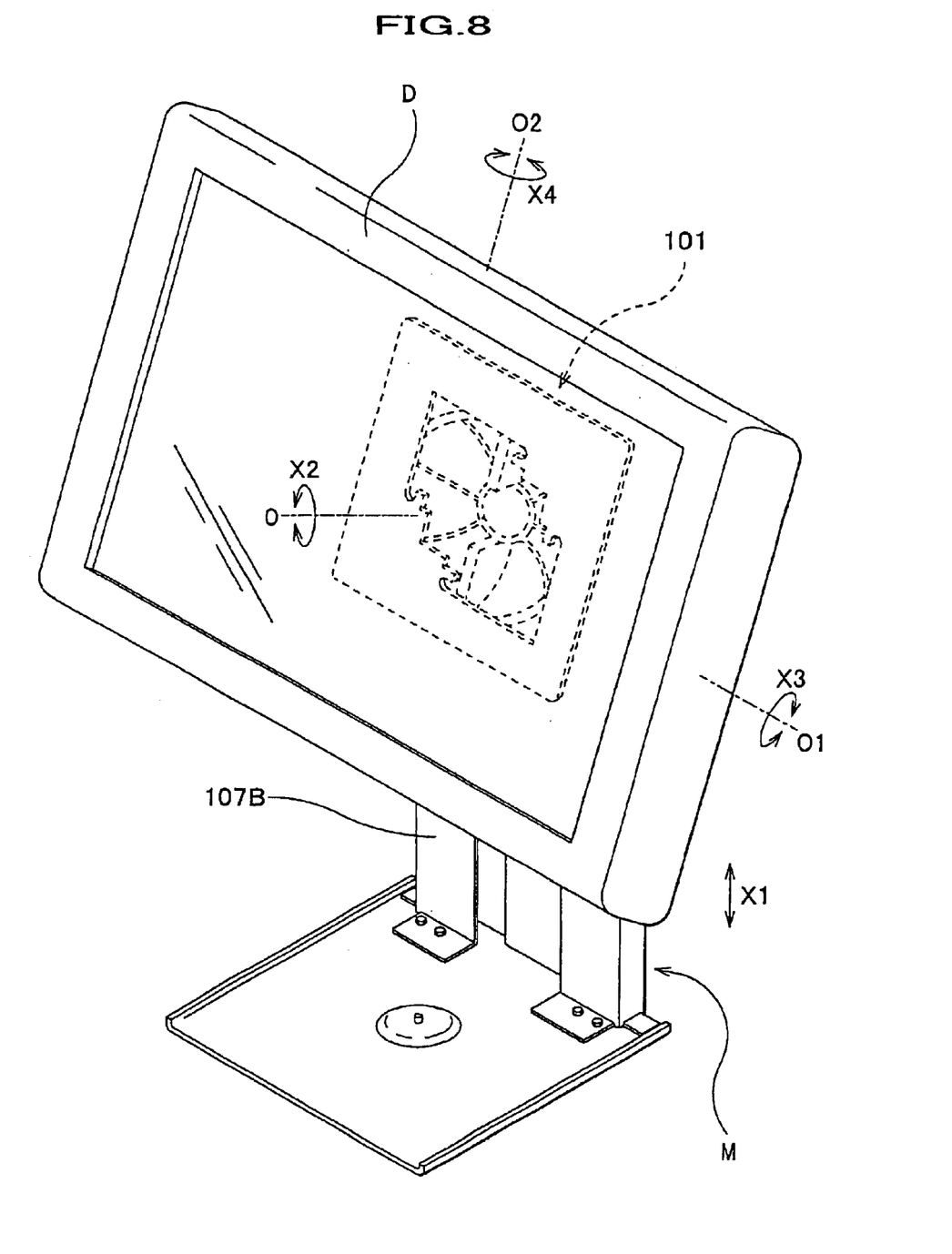
FIG. 8 is a perspective view showing the device for regulating elevation of a display according to the second embodiment.
Figure 9:
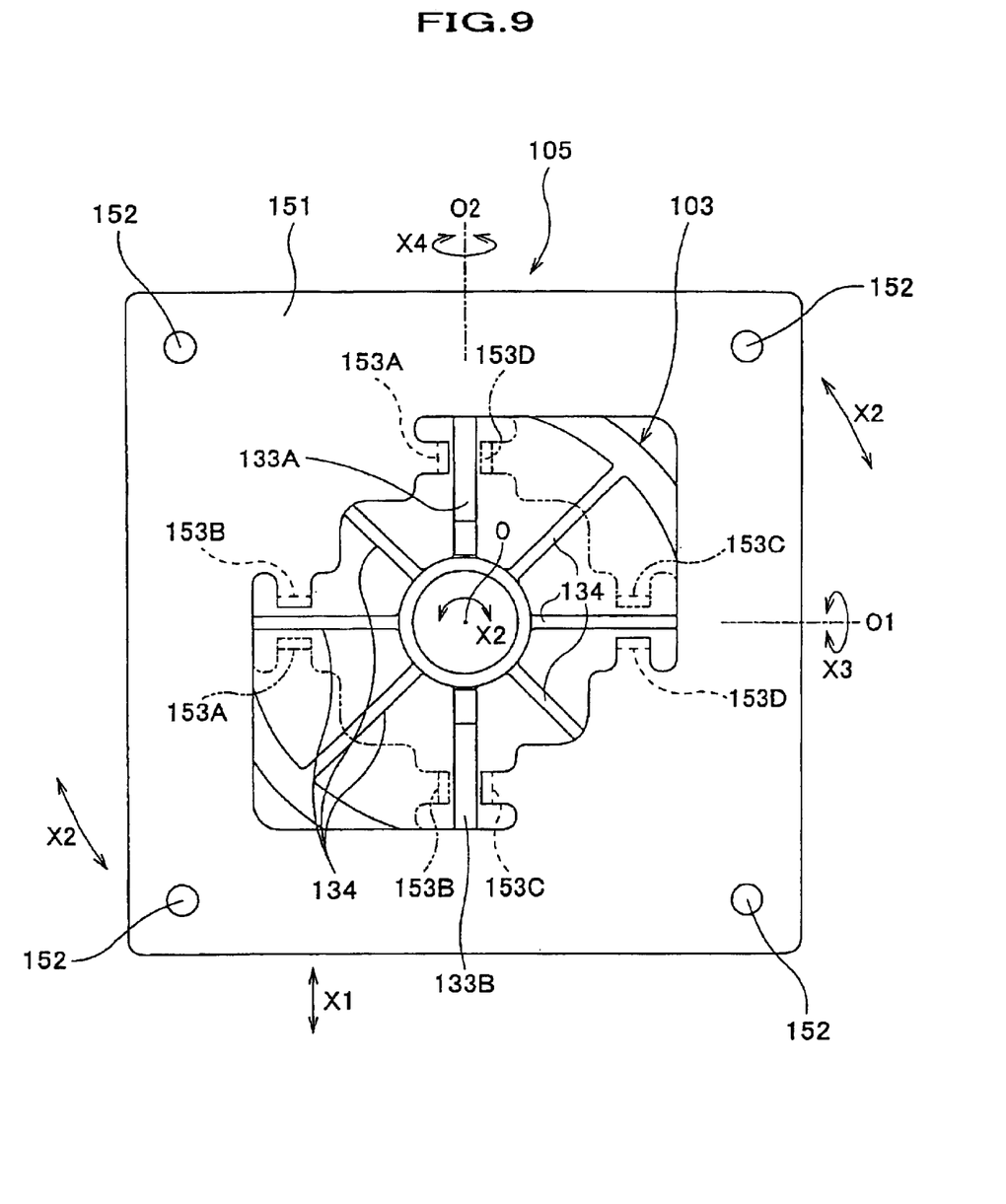
FIG. 9 is an explanatory view showing the rotation of the display mounter.

In addition, four projections 153A, 153B, 153C, and 153D for a stopper, which make up a part of the stopper 106 and which project backward, are formed on the rear surface of the member 105 for regulating an angle. These projections for a stopper 153A to 153D are formed so as to have the same projection amount, and as shown in FIG. 7, each of their lengths are set so as to reach the wall portions 133A and 133B for a stopper formed on a front surface of the cap supporting member 103 and not to reach the reinforcing rib 134. These projections for a stopper 153A to 153D are brought into contact with the wall portions 133A and 133B for a stopper, respectively, whereby the rotation of the member 105 for regulating an angle and the display D held by the member 105 for regulating an angle as shown in FIG. 8 and FIG. 9. This makes it impossible to revolute them any more. The stopper 106 is composed of wall portions 133A and 133B for a stopper provided on the cap supporting member 103 and these projections 153A to 153D for a stopper provided on the member 105 for regulating an angle make up the stopper 106, which regulates the rotation range.

As shown in FIG. 7, the bolt 108 is screwed into the nut 130 provided on a rear side of the base body 121. The bolt 108 has a head portion 108A having a large diameter and a screw portion 108B formed on the edge portion. The screw portion 108B is screwed into the nut 130. The rear surface of the head portion 108A is in a plate form, and a coil spring 109 is intervened between the rear surface and the spring receiver 135 of the cap supporting member 103. The coil spring 109 is fitted in a slightly contracted state.

Here, since the bolt 106 is screwed into the nut 130, the coil spring 109 is in the fixed state fixed to the base member 102. For this reason, the coil spring 109 will expand due to the reverse force to the head portion 108A. At this time, by the resilient force of the coil spring 109, the cap body 131 of the cap supporting member 103 is applied to the resilient force in the direction of the spacer 122. By the application of the resilient force to the cap body 131 in the direction of the spacer 122, the spherical portion 142 of the flange 104 positioned between the cap body 131 and the spacer 122 is sandwiched.

Figure 6:
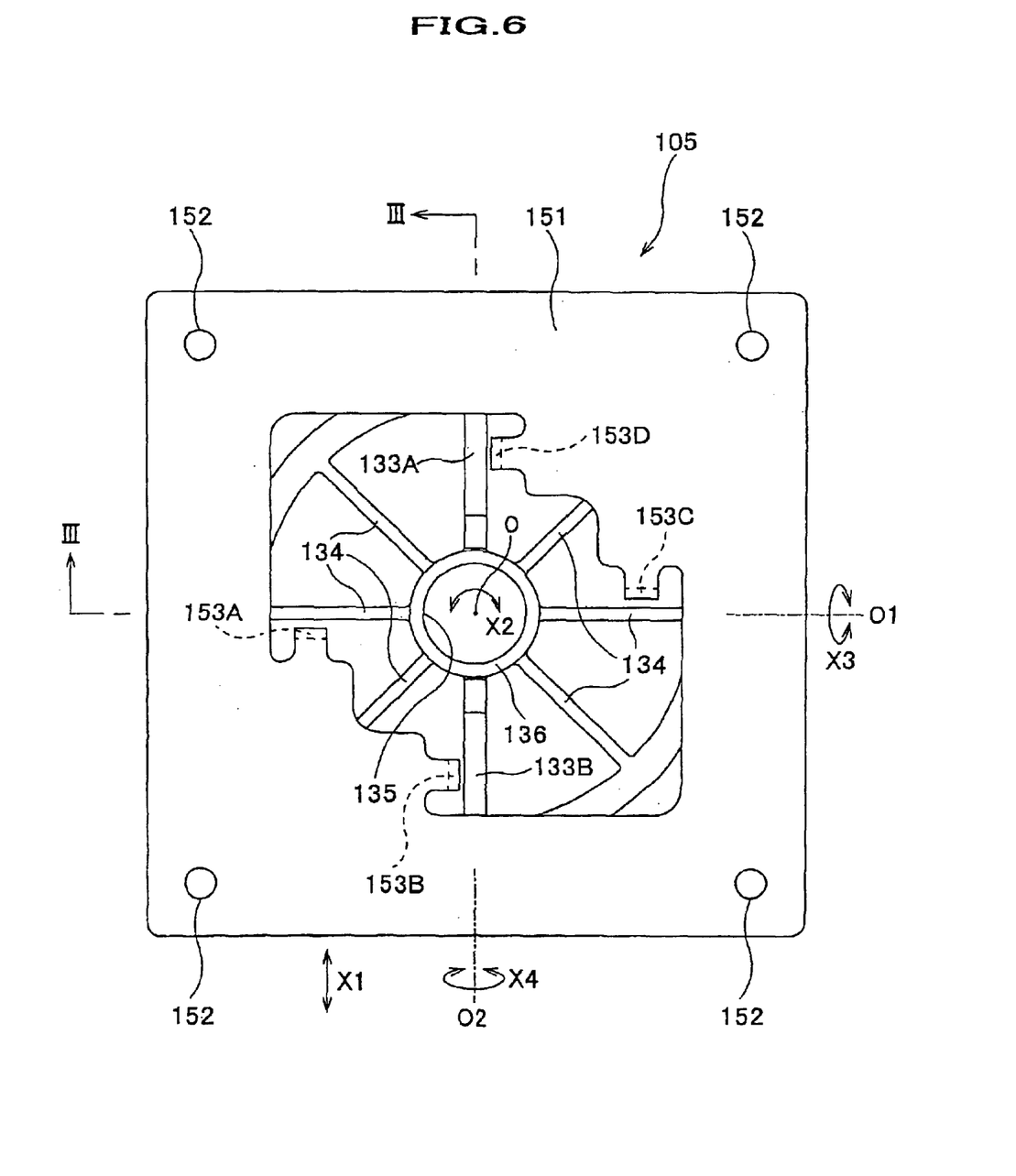
FIG. 6 is a front view of the display mounter of FIG. 5.

As described above, the flange 104 is held by the cap supporting member 103 in a manner that the flange 104 can be slid in any of the directions center axis O at the angel of 90° in the rotating direction X2, the traverse axis O1 in vertically tilting direction X3, and vertical axis O2 in horizontal tilting direction X4 as shown in FIG. 6 and FIG. 7.

The device H' for regulating elevation of a display having construction as described above according to the present invention will now be described.

In the device H' for regulating elevation of a display, the flange 104 is sandwiched between the receiving face 127A of the spacer 122 and the rear surface of the cap supporting member 103, and the display D is held by the flange 104 via the member 105 for regulating an angle. The flange 104 can be slid along the receiving face 127A. By such a structure, as for the display D fitted to the flange 104, the revolution around the center axis O at the angel of 90° in the rotating direction X2, that around the traverse axis O1 in vertically tilting direction X3, and that around the vertical axis O2 in horizontal tilting direction X4 can be performed by only one display mounter 1.

Subsequently, the revolution of the display D around the center axis O at the angel of 90° in the rotating direction X2 will now be described. As shown in an ideal line (double dot line) in FIG. 9, any one of the projections 153B and 153D for a stopper of the member 105 for regulating an angle is brought into contact with any of the wall portions 133A and 133B for a stopper to regulate the movement thereof. It is assumed that at this time, the display D has been turned sideways. In order to turn the display D into the lengthwise direction from this state, when the display D is rotated clockwise around the center axis O shown in FIG. 6 to FIG.

8, the member 105 for regulating an angle is also turned around the center axis O at the angel of 90° in the clockwise rotating direction X2 as shown in FIG. 9. When the display D is rotated clockwise at 90°, now any one of the projections 153A and 153C for a stopper of the member 105 for regulating an angle is brought into contact with any of the wall portions 133A and 133B for a stopper to regulate the movement thereof. At this time, the flange 104 is rotated together with the member 105 for regulating an angle, and the movement is regulated just at the time when they are rotated at 90°. This makes it possible to turn the display which is in the sideway into the lengthwise way.

Next, the revolution of the display D around the traverse axis O1 in vertically tilting direction X3 will now be described. As shown in FIG. 10, the flange 104 can be rotated around the traverse axis O1 shown in FIG. 6 to FIG. 8 relative to the base member 102 and the cap supporting member 103, but the rotation range thereof is regulated. Specifically, by the rotation of the display D around the traverse direction O1, when the flange 104 and the member 105 for regulating an angle is rotated around the traverse direction O1 counterclockwise shown in FIG. 9 from the state where they are positioned at the center shown in the real line to be tilt them downwardly, a lower rear surface of the body 151 of the member 105 for regulating an angle is brought into contact with the wall 133B for a stopper. Also, when the flange 104 and the member 105 for regulating an angle is rotated around the traverse direction O1 clockwise shown in FIG. 9 to be tilt them upwardly, an upper rear surface of the body 151 of the member 105 for regulating an angle is brought into contact with the wall 133B for a stopper. This makes it possible to turn the direction of the display D in vertically tilting direction X3.

Here, when the body portion 151 of the member 105 for regulating an angle is directed downwardly, the projection 153D for a stopper residing above the body portion 151 is never come into contact with the wall 133A for a stopper. However, when the projection 153D for a stopper residing above the member 105 for regulating an angle is not brought into contact with the wall 133A for a stopper, the projection 153B for a stopper residing below the member 105 for regulating an angle is come into contact with the wall 133B for a stopper residing below the cap supporting member 103. In this state, there is a fear that the projection 153B for a stopper residing below the member 105 for regulating an angle is bumped against the reinforcing rib 134 of the cap supporting member 103. However, as shown in FIG. 10 as a broken line, the length of the projection of the reinforcing rib 134 is set to be short, i.e., set so that even if the projection 153B for a stopper comes the closest to the reinforcing rib 134 does not bump against the projection 153B for a stopper. Similarly, it is set that other projections 153A, 153C, and 153D come the closest to the front surface of the cap body 131, they do not bump against the front surface of the cap body 131.

As described above, the body portion 151 of the member 105 for regulating an angle is directed downwardly, the rotation range in an upper direction of the member 105 for regulating an angle and that of the flange 104 can be regulated by means of the projection 153B for a stopper residing below the member 105 for regulating an angle and the wall 133B for a stopper. Conversely, when the body portion 151 of the member 105 for regulating an angle is directed upwardly, the projection 153B for a stopper residing below the member 105 for regulating an angle is not come into contact with the wall 133B for a stopper, but the projection 153D for a stopper residing above the member 105 for regulating an angle is come into contact with wall 133A for a stopper residing above the cap supporting member 103. As described above, when the body portion 151 of the member 105 for regulating an angle is directed upwardly, the rotation range in a lower direction of the member 105 for regulating an angle and that of the flange can be regulated by means of the projection 153D for a stopper residing above the member 105 for regulating an angle and the wall 133A for a stopper of the cap supporting member 103.

At this state, for example, the display D is assumed to be a lengthwise direction, if the display D resides in a width direction, as shown in FIG. 9 as a real line, the projection 153A for a stopper is placed on an upper portion and the projection 153C for a stopper is placed on a lower portion. By functions similar to those of the projections 153D and 153 for a stopper, the rotation of the display D can be regulated. What is more, by placing the stopper at the position where the display D is rotated just at 90°, the display D can easily be set in both the lengthwise direction and the width direction.

In the rotation of the display D shown in FIG. 8 around the vertical axis O2 in horizontal tilting direction X4, in the case where no stopper is provided, the rotation is similar to the rotation of the display D around the traverse axis O1 in vertically tilting direction X3. However, in the case where the projections for a stopper is provided, the rotation of the display D around the vertical axis O2 in horizontal tilting direction X4 is regulated.

Consequently, in the device H' for regulating elevation of a display according to the present invention, the rotation of the display around a center axis O at the angel of 90° in the rotating direction X2, that around a traverse axis O1 in vertically tilting direction X3 and that around a vertical axis O2 in horizontal tilting direction X4, can be performed only by sandwiching the flange 4 by the base member 2 and the cap supporting member 3 in the display mounter 101. Consequently, unlike the prior art in which supporting mechanisms are separately provided in order to meet all the rotation of the display D, a number of parts can be decreased.

Also, in the device H' for regulating elevation of a display according to the present invention, the center P of the rotation of the flange 104 (see FIG. 10), which slides along the receiving face 127A of the pedestal 127 of the spacer 122, in the vertically tilting direction X3 is positioned in front of the receiving face 127A. For this reason, the flange 104, the member 105 for regulating an angle and the display D are rotated around a point positioned in front of the receiving face 127A as a center. By such a construction, when the display is rotated around the vertically tilting direction X3, the movement distance can be reduced in comparison with the prior art.

Furthermore, since the center P of the rotating the flange 104 is positioned in front of the receiving face 127A, the center P of the rotation can be substantially accorded with the center of the gravity of the display D. Specifically, In this embodiment, the center P of the rotating the display D in the vertically tilting direction X3 is accorded with the center of the gravity of the display D.

As described above, since the center P of the rotating the display D in the vertically tilting direction X3 is accorded with the center of the gravity of the display D, the center of the gravity of the display D can be substantially unchanged even when the display is rotated. Consequently, the user can rotate the display D always by substantially the same force, and the display D can effectively be prevented from being felt down towards the front side.

Preferred embodiments of the present invention have been described, but the present invention is not restricted thereto. For example, in order to prevent the display from being rotated due to vibration or such when the display is in the lengthwise or width direction, a ball click for imparting so called click feeling may be provided on the flange and the base member.

Also, the parts described above may be produced in a unified state to further decrease the number of parts. It is noted that materials for each parts may be freely selected, for example, part of or all of the parts may be made of, e.g., a metal, a resin, a reinforcing plastic, or such.

INDUSTRIAL APPLICABILITY

As described above, the device for regulating elevation of a display according to the present invention is suitable for use in a supporting device which supports a display such as CRT for personal computer or a television set, a liquid crystal display, a plasma display or a display utilizing LED in a manner so as to freely adjust the angle of the display.

What is claimed is:

1. A display mounting device comprising:

a base member;

an elevating member which is relatively movable along said base member and which has a display mounting portion;

a spiral spring configured to apply a force to said elevating member to push the elevating member apart from the base member; and a spacer whose one end is rotatably connected to the elevating member via a shaft and which is provided between the base member and the elevating member, the spacer having a resilient member which applies a rotational force around the shaft to the spacer to press the spacer toward the base member.

2. The display mounting device according to claim 1, wherein the base member comprises, a guide portion configured to guide a movement of said elevating member, and a center guide member connecting the elevating member to the base member.

3. The display mounting device according to claim 1, wherein said spacer is made of a resin.

4. The display mounting device according to claim 1, wherein said resilient member is a deforming portion.

5. A display mounting device comprising:

a base member;

an elevating member which is relatively movable along said base member and which has a display mounting portion;

means for applying a force to said elevating member to push the elevating member apart from the base member; and a spacer whose one end is rotatably connected to the elevating member via a shaft and which is provided between the base member and the elevating member, the spacer having a resilient member which applies a rotational force around the shaft to the spacer to press the spacer toward the base member.

* * * * *